United States Patent
Hempstead

(10) Patent No.: US 10,893,577 B2
(45) Date of Patent: Jan. 12, 2021

(54) MILLIMETER WAVE HEATING OF SOOT PREFORM

(71) Applicant: Corning Incorporated, Corning, NY (US)

(72) Inventor: Martin Hempstead, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 319 days.

(21) Appl. No.: 15/700,294

(22) Filed: Sep. 11, 2017

(65) Prior Publication Data
US 2018/0084609 A1    Mar. 22, 2018

Related U.S. Application Data

(60) Provisional application No. 62/396,428, filed on Sep. 19, 2016.

(51) Int. Cl.
*H05B 3/00* (2006.01)
*C03B 37/014* (2006.01)

(52) U.S. Cl.
CPC ..... *H05B 3/0033* (2013.01); *C03B 37/01446* (2013.01); *C03B 37/01453* (2013.01); *C03B 2201/10* (2013.01); *C03B 2201/12* (2013.01)

(58) Field of Classification Search
None
See application file for complete search history.

(56) References Cited

U.S. PATENT DOCUMENTS

| | | | | | |
|---|---|---|---|---|---|
| 3,737,292 | A | * | 6/1973 | Keck et al. | C03B 37/01413 65/421 |
| 3,737,293 | A | * | 6/1973 | Maurer | C03B 37/01807 65/417 |
| 3,781,152 | A | * | 12/1973 | Keller | C23C 16/01 425/174.8 R |
| 3,932,160 | A | * | 1/1976 | Camlibel | C03B 37/018 65/421 |
| 4,074,441 | A | * | 2/1978 | Helversen | D21F 5/182 162/290 |
| 4,209,229 | A | * | 6/1980 | Rittler | C03B 37/027 385/123 |
| 4,450,333 | A | * | 5/1984 | Andrejco | C03B 37/029 219/649 |

(Continued)

FOREIGN PATENT DOCUMENTS

| JP | 2004115299 A | 4/2004 |
|---|---|---|
| JP | 2005179071 A | 7/2005 |
| JP | 04458963 B2 | 4/2010 |

OTHER PUBLICATIONS

Naftaly et al; "Terahertz Time-Domain Spectroscopy of Silicate Glasses and the Relationship to Material Properties"; Journal of Applied Physics, 102, 2007 pp. 043517-1-043517-6.

*Primary Examiner* — Thor S Campbell
(74) *Attorney, Agent, or Firm* — Kevin L. Bray

(57) ABSTRACT

An improved process for preheating and doping a preform having a consolidated glass core and a silica soot cladding surrounding core involves waveguiding millimeter wavelength electromagnetic radiation into the preform to cause heating of the preform within the interior via absorption of the electromagnetic radiation by silica in the preform while the preform is exposed to a gas phase dopant.

26 Claims, 3 Drawing Sheets

(56) References Cited

U.S. PATENT DOCUMENTS

| | | | | |
|---|---|---|---|---|
| 4,708,726 A * | 11/1987 | Miller | C03B 37/01493 | 65/421 |
| 4,941,905 A * | 7/1990 | Narasimham | C03B 37/01446 | 65/421 |
| 5,203,899 A * | 4/1993 | Kyoto | C03B 37/01446 | 65/398 |
| 5,227,600 A * | 7/1993 | Blake | C04B 35/111 | 219/678 |
| 5,736,092 A * | 4/1998 | Apte | C04B 35/117 | 264/432 |
| 6,477,307 B1 * | 11/2002 | Tankala | C03B 37/01211 | 385/127 |
| 7,536,877 B2 | 5/2009 | Hong | C03B 37/027 | 65/402 |
| 2002/0094180 A1 * | 7/2002 | Antos | C03B 37/01446 | 385/123 |
| 2002/0162359 A1 * | 11/2002 | Tennent | C03B 19/106 | 65/391 |
| 2003/0044603 A1 * | 3/2003 | Morita | B82Y 30/00 | 428/367 |
| 2003/0066829 A1 * | 4/2003 | Kansa | F23G 5/027 | 219/630 |
| 2006/0137398 A1 * | 6/2006 | Bleaking | C03B 19/1453 | 65/17.3 |
| 2006/0228897 A1 * | 10/2006 | Timans | H01L 21/67115 | 438/758 |
| 2006/0266956 A1 | 11/2006 | Sklyarevich et al. | | |
| 2008/0285926 A1 * | 11/2008 | Sahu | C03B 37/014 | 385/123 |
| 2011/0177333 A1 * | 7/2011 | Schoetz | C03B 37/01426 | 428/376 |
| 2012/0091832 A1 * | 4/2012 | Soderberg | C08J 3/00 | 310/44 |
| 2012/0259036 A1 * | 10/2012 | Takahashi | F16D 69/026 | 523/155 |
| 2013/0089296 A1 * | 4/2013 | Hoshino | C03B 37/01446 | 385/123 |
| 2013/0129291 A1 * | 5/2013 | Hoshino | G02B 6/02042 | 385/123 |
| 2014/0161406 A1 * | 6/2014 | Kumano | C03B 37/01446 | 385/128 |
| 2016/0016839 A1 * | 1/2016 | Schwerin | C03B 23/045 | 501/54 |
| 2016/0304392 A1 * | 10/2016 | Bookbinder | C03C 3/06 | |
| 2017/0126087 A1 * | 5/2017 | Soderberg | H02K 21/042 | |
| 2017/0341967 A1 * | 11/2017 | Laudahn | B01J 20/103 | |
| 2018/0057396 A1 * | 3/2018 | Li | G01D 5/35364 | |
| 2018/0148366 A1 * | 5/2018 | Dawes | C03B 37/018 | |
| 2018/0207863 A1 * | 7/2018 | Porter | B29C 64/129 | |
| 2019/0072714 A1 * | 3/2019 | Butler | H01S 3/0632 | |

* cited by examiner

MILLIMETER WAVE HEATING OF SOOT PREFORM

This application claims the benefit of priority under 35 U.S.C. § 119 of U.S. Provisional Application Ser. No. 62/396,428 filed on Sep. 19, 2016 the content of which is relied upon and incorporated herein by reference in its entirety.

FIELD OF THE DISCLOSURE

This disclosure relates to the field of optical fiber production, and more specifically to doping of soot cladding of an optical fiber preform and densification of the doped soot cladding to produce a densified optical fiber preform with doped cladding that can be drawn into optical fiber.

BACKGROUND OF THE DISCLOSURE

In the process of manufacturing optical fibers, preforms can be produced by various methods including outside vapor deposition (OVD) and vapor axial deposition (VAD). Porous preforms produced by both of these techniques are formed of glass soot or particles and must be dried and sintered. The drying step reduces the residual OH content of the resulting blank, thereby, reducing in optical fiber drawn from the blank absorption loss caused by OH groups in the vicinity of the 1300 nm operating wavelength. The step of sintering a preform produces a dense, substantially clear draw blank which is then drawn into the optical fiber. The combined steps of drying and sintering are referred to as consolidation.

Currently preforms are heated, for example to achieve consolidation by a process of heat diffusion, whereby the outer surface of the preform is heated by thermal radiation and/or convection, and the thermal energy diffuses to the center of the preform.

This heating process is very slow, being limited by the thermal transfer coefficients of the preform material, and can take many hours. This long process time dictates the need for large numbers of ovens to support fiber demand.

For glasses with a relatively high electrical conductivity, more rapid methods of heating such as induction might be used, but the low conductivities of the high-purity silica used in optical fibers do not facilitate induction heating. Similar restrictions apply to microwave heating.

SUMMARY OF THE DISCLOSURE

Disclosed is a process for preheating a soot preform having a glass core and a silica soot cladding surrounding the core to facilitate doping of the cladding prior to densification or sintering at a higher temperature to produce a dense, substantially clear optical fiber blank. Millimeter wavelength (e.g., about 0.6 mm to about 3 mm) electromagnetic (EM) radiation is used during the preheating to achieve more rapid heating as compared with conventional preheating that relies on thermal diffusion from the surface of the soot. The process exploits the property of the preform to behave as a waveguide to improve the performance of the consolidation step of optical fiber manufacturing.

Previous methods for preform heating relied on thermal conduction to raise the temperature of the interior of the preform. The process disclosed herein uses the low frequency absorption edge of silica to deliver non-thermal EM radiation deep into the preform, where it is absorbed and heats the material directly. By changing the radiation frequency, penetration depth can be controlled, and by controlling the power, the heating rate can be rapidly modified. The EM radiation can be manipulated with suitable optics to control the spatial distribution of the heating to a resolution of a few millimeters. The cylindrical form of the preform can be exploited as a waveguide for the radiation.

The millimeter wavelength radiation can be generated by a gyrotron. Gyrotrons are already in use in industrial processes for the heating of ceramics.

The use of millimeter wavelength electromagnetic radiation for heating facilitates reduced time for doping of a soot preform to make an optical fiber blank. It also facilitates improved process control, allowing real-time controllable heating rates, design controllable or real-time controllable spatial distribution of heating, and tuning of the radiation to material attributes, such as heating core and cladding at different times.

The process disclosed herein is also expected to provide more energy-efficient heating and reduced operating costs. The use of millimeter wavelength EM radiative heating is also expected to facilitate faster heating and doping of optical fiber preforms leading to higher throughput and possible capital cost savings.

The present disclosure extends to:

A process for heating a preform comprising:

exposing a preform to electromagnetic radiation having a wavelength in the range from 0.6 mm-3.0 mm, the preform comprising silica soot, the silica soot absorbing the electromagnetic radiation, the absorbed electromagnetic radiation heating the silica soot to a temperature in the range from 1075° C.-1325° C.

DETAILED DESCRIPTION OF SPECIFIC EMBODIMENTS

Known processes for drying and/or consolidating a soot preform generally involve heating the surface of the preform for a time sufficient to cause the interior of the preform to heat to the sintering temperature of the preform material. This process takes several hours. The concept of the disclosed process is to use millimeter wavelength EM radiation that is at least partially absorbed by silica to cause the interior of the preform to heat up. This process shortens the time needed to reach a suitable dwell temperature for doping of the preform. The process allows adjustment of the penetration depth of the radiation and thus allows the thermal distribution to be controlled to the extent that the frequency of the radiation can be adjusted from the source. The term "millimeter wavelength" refers to electromagnetic wavelengths in the range from 0.6 mm-3.0 mm, or to specific wavelengths between 0.6 mm and 3.0 mm, or to wavelength ranges within the range from 0.6 mm-3.0 mm, such as wavelengths in the range from 0.7 mm-2.5 mm, or wavelengths in the range from 0.85 mm-2.25 mm, or wavelengths in the range from 1.0 mm-2.0 mm.

The disclosed processes can be used for shortening the preheat time to prepare the preform for doping prior to sintering. A suitable pre-heat temperature is typically from about 1000° C. to about 1300° C. The disclosed process can be used for such preheating, sintering or both preheating prior to doping and during sintering.

Figure 1:
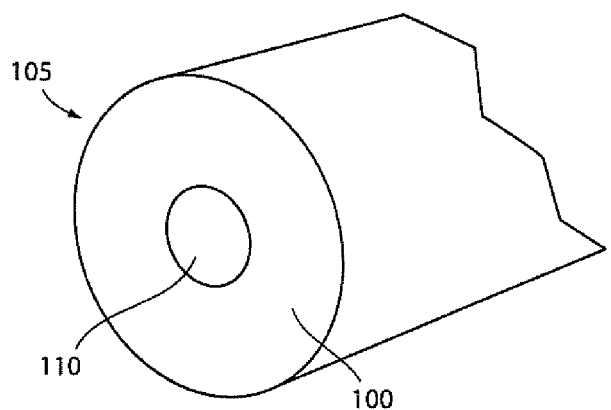
FIG. 1 is a perspective view of a portion of a cylindrically shaped soot preform.

FIG. 1 shows an optical fiber preform. The preform 105 includes a core cane 110 surrounded by a silica soot cladding 100. The core cane 110 is a fully consolidated glass that differs in composition from the soot cladding 100. The core cane has a higher refractive index than the soot cladding and becomes the central core portion of the optical fiber that is ultimately drawn from the preform. The core cane has a cylindrical shape. The soot cladding is porous and annular in shape. Preform 105 is assembled by inserting core cane 110 in the central cavity of the soot cladding 100. The thickness of the soot cladding 100 in a representative preform 105 is about 11 cm. Thermal processing of preform 105 after assembly leads to sintering of soot cladding 100 to provide an optical fiber preform with a densified cladding. An optical fiber preform having a fully densified cladding is used for drawing optical fibers.

Pure silica can be used as a cladding material, but it is often beneficial to dope the cladding to alter refractive index and achieve preferred optical properties in the ultimate fiber drawn from a fully densified optical fiber preform. Doping entails exposing the soot cladding to a gas phase precursor before and/or during consolidation. The gas phase precursor reacts with the porous soot cladding to dope the soot. Preferred dopants for the cladding are Cl and F. The most common dopant precursors for Cl and F are $SiCl_4$ and $SiF_4$. Uniformity of doping in the cladding is a key design goal. In order to achieve uniform doping, it is necessary to dope the soot cladding while it is sufficiently porous so that the doping precursor can be uniformly distributed throughout the cladding.

To increase the rate of doping, the temperature of the soot cladding is increased. The doping precursors react more quickly at higher temperatures. If the temperature of the soot cladding increases above a certain threshold, however, the soot begins to sinter. Sintering leads to a closing of pores in the soot cladding and compromises the objective of uniform doping. Thus, the temperature of doping needs to be carefully selected to obtain a proper balance between reaction rate of the doping precursor and uniformity of the doped profile.

A preferred temperature range for doping of silica is from about 1000° C. to about 1300° C. If the temperature is below 1000° C., the doping precursors react too slowly for a practical process and if the temperature is above 1300° C., the soot cladding consolidates too quickly and pores close, resulting in a non-uniform doped concentration profile in the doped layer.

The millimeter wavelength source is used to heat the soot cladding to a temperature in the doping temperature range. We refer to this step as a preheating step. In the preheating step, the soot cladding is exposed to millimeter wavelength radiation provided by the millimeter wavelength source. In the traditional process, preheating is accomplished with a conventional heating source, such as a furnace. Because of the low thermal conductivity of silica soot, preheating with a conventional source takes several hours. An advantage of the millimeter wavelength (0.6 mm to 3 mm) heating source is faster heating of the soot cladding during preheating. Heating with a conventional source is driven by thermal diffusion from the outer boundary of the soot cladding to the inner interface of the soot cladding with the core cane. The mechanism of heating with the millimeter wavelength source is absorption of millimeter wavelength electromagnetic radiation by the soot cladding, so the inner radial portions of the soot cladding can be heated essentially instantaneously with the outer boundary and the need to wait for thermal diffusion is avoided. After doping, the preform is sintered by heating to a temperature above 1300° C. for a time period sufficient to achieve a preform that includes a densified or fully densified doped cladding surrounding the fully densified core cane. The sintering temperature is a temperature above 1300° C., or above 1350° C., or above 1400° C., or above 1450° C., or above 1500° C., or in the range from 1300° C.-1700° C., or in the range from 1350° C.-1600° C., or in the range from 1400° C.-1550° C.

Preheating with the millimeter wavelength source can occur from room temperature up to the doping temperature, or from any temperature below the doping temperature to the doping temperature. Preheating with the millimeter wavelength source heats the soot cladding from an initial temperature to a final temperature. The initial temperature is in the range from 10° C.-1000° C., or in the range from 15° C.-750° C., or in the range from 15° C.-500° C., or in the range from 15° C.-250° C., or in the range from 15° C.-100° C. The final temperature is in the range from 750° C.-1325° C., or in the range from 1075° C.-1325° C., or in the range from 1100° C.-1300° C., or in the range from 1125° C.-1275° C., or in the range from 1150° C.-1250° C. Preheating with the millimeter wavelength source persists to maintain the soot cladding at the final temperature for a time of at least 10 min, or at least 20 min, or at least 30 min, or at least 60 min, or in the range from 10 min-240 min, or in the range from 30 min-180 min, or in the range from 45 min-165 min, or in the range from 60 min-150 min, or in the range from 75 min-135 min. Preheating with the millimeter wavelength source can be supplemented by heating with a conventional heating source.

To achieve uniform doping at an appreciable rate, the inner interface of the soot cladding with the core cane should achieve a minimum temperature of about 1000° C. The temperature of the outer boundary of the soot cladding can differ from the temperature of the interface of the soot cladding with the core cane. However, the outer boundary of the soot cladding is preferably less than about 1300° C. to minimize sintering of the outer portion of the soot cladding during the doping process.

The density of the soot cladding increases with heating above a certain temperature. Uniformity of doping requires adequate porosity of the soot cladding. Porosity correlates with density. The density of the soot cladding is preferably about 0.25 g/cm³ or greater when doping. Densifications up to 1.0 g/cm³ can be tolerated. The millimeter wavelength source is used to heat the preform to a temperature such that the density of the soot cladding is below 1.0 g/cm³. A certain degree of densification of the soot cladding can be tolerated while still accomplishing doping. No or minimum densification occurs during the preheating if temperatures are maintained at or only slightly above 1100° C. Densification of the soot cladding can occur during preheating, but to a degree that insures that no portion of the soot cladding has a density above 1.0 g/cm³. The density of the soot cladding in some embodiments is greater than 0.3 g/cm³, in some other embodiments greater than 0.4 g/cm³ and in some other embodiments greater than 0.45 g/cm³ when doping. The density of the soot cladding in some embodiments is less than 1 g/cm³, in some other embodiments less than 0.8 g/cm³ and in some other embodiments less than 0.6 g/cm³ when doping. The density of the soot cladding during the doping process is in the range from 0.25 g/cm³-1.0 g/cm³, or in the range from 0.35 g/cm³-1.0 g/cm³, or in the range from 0.40 g/cm³-1.0 g/cm³, or in the range from 0.45 g/cm³-1.0 g/cm$^3$, or in the range from 0.35 g/cm$^3$-0.85 g/cm$^3$, or in the range from 0.40 g/cm$^3$-0.85 g/cm$^3$. The temperature of the soot cladding during the doping process is in the range from 1000° C.-1325° C., or in the range from 1050° C.-1300° C., or in the range from 1100° C.-1300° C., or in the range from 1125° C.-1275° C., or in the range from 1150° C.-1250° C.

Absorption of millimeter electromagnetic radiation by the soot cladding can be facilitated by waveguiding. Waveguiding requires deliberate configuration of the millimeter wavelength heating source relative to the soot cladding and will not necessarily occur accidentally or inherently by merely exposing the preform to millimeter electromagnetic waves.

Preheating and doping of the preform are followed by sintering to a fully densified state to provide an optical fiber preform suitable for drawing optical fibers. A fundamental step is preheating with a millimeter wavelength source to a temperature in the doping temperature range. Doping times are at least 10 min, or at least 20 min, or at least 30 min, or at least 60 min, or in the range from 10 min-240 min, or in the range from 30 min-180 min, or in the range from 45 min-165 min, or in the range from 60 min-150 min, or in the range from 75 min-135 min.

Silica has an absorption band that extends from about 100 GHz frequency (3 mm vacuum wavelength) to about 120 THz frequency (2.5 μm wavelength). Working near either end of that band allows controllable penetration and absorption of radiation throughout a volume of silica. An absorbed power of 9 kW will heat a 45 kg silica preform from 25° C. to 1000° C. in about 1 hour, assuming no significant heat loss from the preform. High-power, tunable lasers are required to permit heating at the 2.5 μm end of the silica absorption band. No practical sources around this wavelength are currently available. Sources such as gyrotrons for the 100 GHz region are commercially available at high power. One supplier of gyrotrons is CPI (Communications and Power Industries). CPI produces a 140 GHz source capable of 90 kW output. Other suppliers include Gyrotron Technology Inc.

Figure 2:
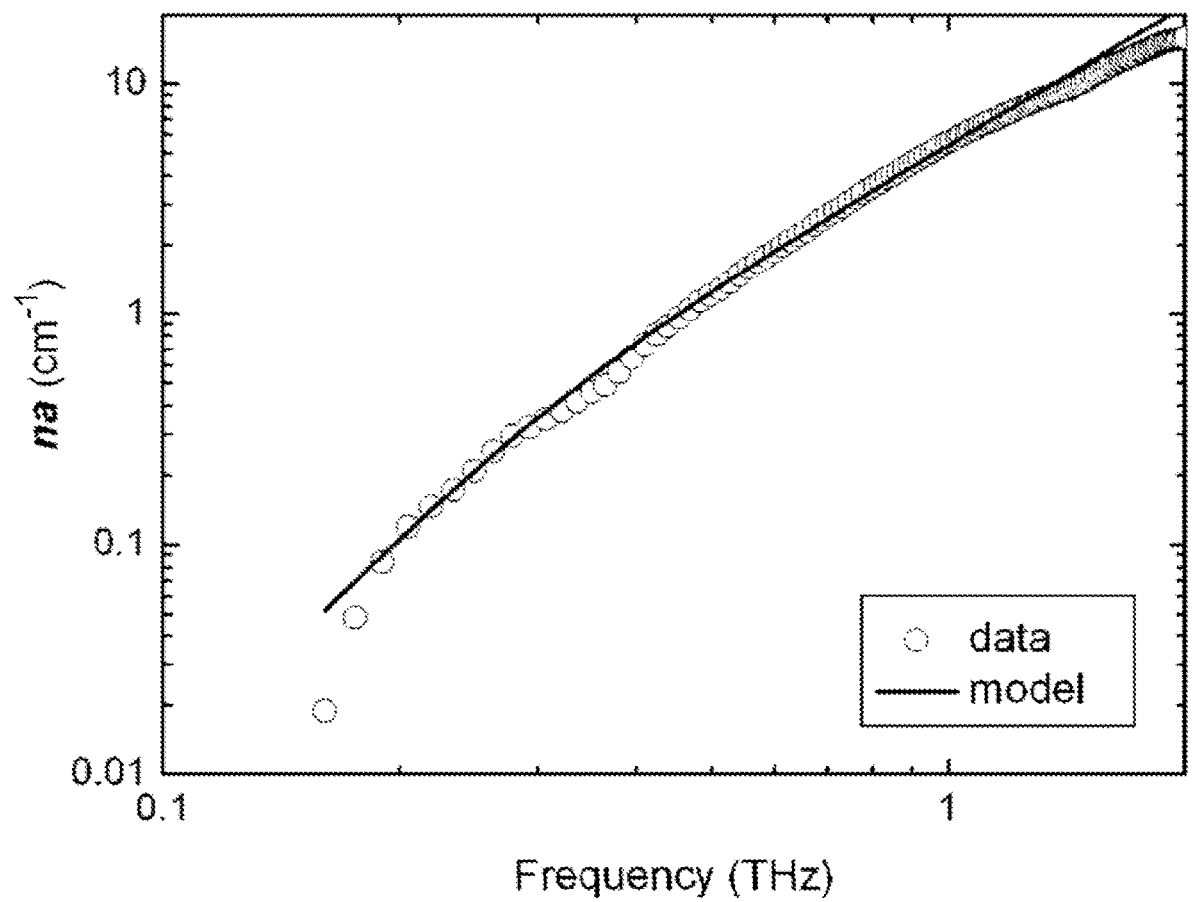
FIG. 2 is a graph showing absorption as a function of frequency for silicate glasses.

Silica is not optimal for heating by the low-frequency end of the millimeter wave spectrum because the absorption decreases significantly below about 200 GHz. FIG. 2 shows the product of refractive index (n) and absorption coefficient (a) of silica in the frequency region from about 0.16 THz (160 GHz) to above 1 THz (1000 GHz). See "Terahertz time-domain spectroscopy of silicate glasses and the relationship to material properties", M. Naftaly and R. E. Miles, Journal of Applied Physics 102, 043517 (2007). FIG. 2 indicates that the absorption of silica decreases significantly at frequencies below about 0.20 THz (200 GHz), the frequency range at which highest powers are available from commercial gyrotron sources. Since the refractive index of silica is around 2 in this frequency range, the absorption at 160 GHz is about 0.01 cm$^{-1}$. Based on this value of absorption, only 10% of the energy at 160 GHz is absorbed over a path length of 10 cm of silica. To achieve more uniform heating throughout the volume of the perform, longer path lengths are preferred (e.g., 40% absorption of the energy at 160 GHz requires a path length of 50 cm and 86% absorption of the energy at 160 GHz requires a path length of 2 m of silica).

High powers are available up to at least 200 GHz frequency, and frequencies up to 3 THz may be useful in the disclosed processes, when and if sources operating at these frequencies become practical. As the frequency increases, the absorption increases, penetration depth decreases, and shorter path lengths can be used. Good absorption should be achievable up to at least 500 GHz.

The disclosed processes can be used to preheat the soot cladding to promote doping prior to consolidation of the cladding, and optionally to consolidate the cladding 100 of a preform 105 (See FIG. 1). A typical radial thickness of the soot prior to densification would be between about 9 cm and 14 cm. During sintering and consolidation, shrinkage is mostly in the radial direction, so the consolidated preform cladding layer would be about 2-6 cm thick.

Figure 3:
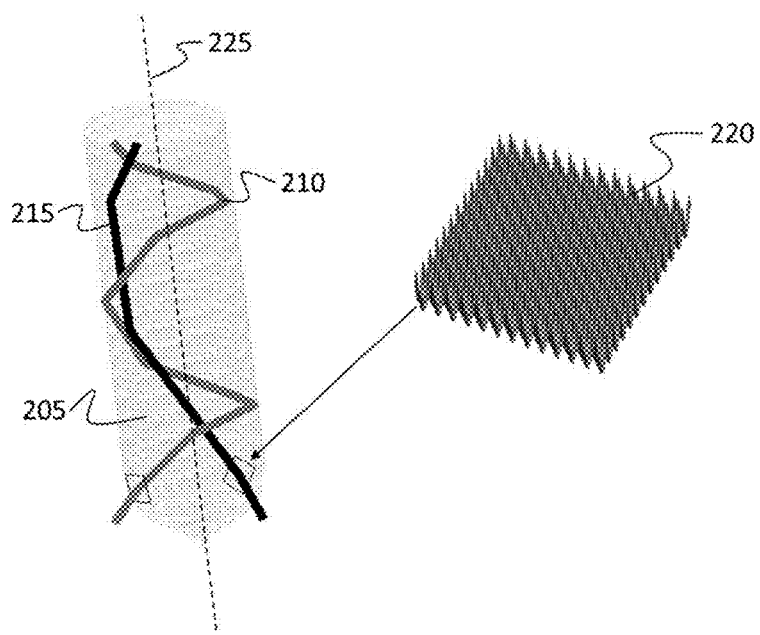
FIG. 3 depicts propagation of electromagnetic radiation along two pathways in a preform and texturing features on the surface of the preform.

Long path lengths for absorption of millimeter wavelength radiation by the soot cladding are achievable within the context of the present disclosure because the silica or doped silica preform acts as a waveguide in the millimeter wavelength range. For example, long path lengths can be obtained through waveguiding by directing millimeter wavelength radiation along, in the direction of, or in a path that circumscribes the central longitudinal axis of the preform. FIG. 3 shows two representative paths, 210 and 215, of beams of electromagnetic radiation through preform 205. Paths 210 and 215 circumscribe central longitudinal axis 225 of preform 205. An embodiment showing texturing 220 at the entrance surface of the electromagnetic radiation to the preform (see below) is also depicted in FIG. 3.

For unconsolidated soot at room temperature, the path length for reasonable absorption would be a maximum of about 2 m at 200 GHz wavelength. Extended path lengths can be achieved in the preform by launching the millimeter wavelength range radiation at the base of the preform to make the radiation follow a helical path that circumscribes the central longitudinal axis.

The preform will behave as a multimode waveguide at millimeter wavelength frequencies, and beams of millimeter wavelength range radiation on the order of a few cm in diameter can be launched into the preform and directed to follow an axial (longitudinal) path (e.g. a path along or parallel to the central longitudinal axis of the preform), or a quasi-helical path of rays traversing ascending chords confined by total internal reflection (e.g. a quasi-helical path that circumscribes the central longitudinal axis or an axis parallel to the central longitudinal axis). The quasi-helical path will increase the path length and thus the absorption in the preform. The path length can be controlled by the pitch of the helix, which in turn is controlled by the launch angle of the beam. At higher gyrotron frequencies and shorter absorption lengths, the millimeter wavelength range radiation can be launched transversely as multiple beams.

If the millimeter wavelength beam is launched in a quasi-helical path, one method to make the absorption by the preform more uniform is to rotate the preform around its central longitudinal axis, or, equivalently, to rotate the launch point of the millimeter wavelength beam at the base of the preform.

As an initially collimated millimeter wavelength beam propagates within the preform, it will diverge in such a manner as to spread the power more uniformly in an azimuthal (radial) direction (e.g. a direction normal to the central longitudinal axis). Injection of millimeter wavelength beams at each end of the preform will provide a more uniform heating profile than a single millimeter wavelength beam at one end.

Another strategy for increasing path length is to place the preform inside a reflective cavity so that millimeter wavelength range radiation that passes through the preform without being absorbed can be reflected back into the preform multiple times to increase the effective path length. The preform may be contained in an enclosure that has walls or surfaces that scatter or reflect millimeter wavelength electromagnetic radiation, so that millimeter wavelength radiation that escapes the preform will be scattered or reflected back into the preform for further absorption. Scattering or reflecting materials for these wavelengths can be constructed, for example, as metamaterials with dimensions on the order of 1 mm scale (e.g., 0.5 mm to 10 mm).

Since absorption of millimeter wavelength radiation increases rapidly with frequency above 100 GHz, the path length over which a specified fraction of millimeter wavelength radiation is absorbed can be controlled by controlling the frequency. The absorption of silica at 200 GHz, for example, is about 5 times greater than the absorption of silica at 160 GHz, so commensurately shorter path lengths are needed at higher frequencies to achieve a given level of absorption.

Unconsolidated soot performs have a low density, so the optical properties of the preform will change substantially during sintering as the preform densifies. A typical preform at the beginning of the sintering process has a density of about 20% of the density of a fully densified preform. Table 1 shows the estimated refractive index and critical angle for total internal reflection as a function of density at room temperature for silica. Density is expressed as a ratio of the soot density of an unconsolidated preform to the density of fully densified silica glass. As the preform densifies during sintering, the refractive index increases and the critical angle of incidence for total internal reflection decreases.

TABLE 1

| Soot density/ Glass density | Soot refractive index in GHz regime | Critical angle/ degrees |
|---|---|---|
| 0.2 | 1.2 | 60.0 |
| 0.3 | 1.2 | 54.0 |
| 0.4 | 1.3 | 49.1 |
| 0.5 | 1.4 | 45.0 |
| 0.6 | 1.5 | 41.4 |
| 0.7 | 1.6 | 38.2 |
| 0.8 | 1.7 | 35.3 |
| 0.9 | 1.9 | 32.5 |
| 1.0 | 2.0 | 30.0 |

As the preform densifies, the launch angle can be altered to accommodate the changing refractive index. The launch path can also be varied and/or dithered to inhibit localized densification.

Since silica absorption at GHz frequencies is due to a process of coupling GHz photons to multiple phonons, the absorption strength will increase significantly as the preform heats up. In fact, at temperatures in the later stages of sintering (~1500° C.), the absorption might be several times higher than at room temperature. This can be accommodated, as with the preform sintering, by decreasing the path length in the preform as the temperature rises or by tuning the millimeter wavelength excitation source to a different (e.g. lower) frequency.

Particularly at the later stages of sintering, some of the impinging millimeter wavelength range radiation will be reflected by the densified material that has nearly completely transitioned to a more fully densified state. The reflection loss can be mitigated by texturing the preform surface at the region of launch to provide antireflection properties (FIG. 3). The length scale of texture (e.g., distances between crests of adjacent texturing features and heights of those features) needed to mitigate reflection of millimeter wavelengths is sub-millimeter, and is readily achievable by a variety of techniques known in the art. To prevent the textured structure from compromising attributes of fibers drawn from the densified preform, the millimeter wavelength beam can be launched in "waste" regions (i.e., regions that are not transformed into optical fibers during a subsequent drawing step), of the preform, such as at the root or handle. The textured, anti-reflection surface structure can be made independently and flame-worked onto the preform.

Because heating occurs throughout the soot preform due to absorption of the millimeter wavelength radiation, which is highly controllable, the temperature gradient in the preform (i.e., temperature difference between the axial center and outer radial surface of the soot preform) can be controlled to a relatively low value, such as less than 200° C., less than 100° C. or less than 50° C.

Use of a mixture of millimeter wavelengths will allow heating of regions of the glass with different composition, and also provide a more uniform distribution of heating if hot spots are an issue with a particular fiber and/or preform configuration.

The described embodiments are preferred and/or illustrated, but are not limiting. Various modifications are considered within the purview and scope of the appended claims.

What is claimed is:

1. A process for heating a preform comprising:
exposing a preform to electromagnetic radiation having a wavelength in the range from 0.6 mm-3.0 mm, the preform comprising silica soot, the silica soot absorbing the electromagnetic radiation, the absorbed electromagnetic radiation heating the silica soot to a temperature in the range from 1075° C.-1325° C.;
wherein the preform has an elongate shape, the elongate shape having a central longitudinal axis, the elongate shape including a first end and a second end, the silica soot extending from the first end to the second end; and
wherein the exposing includes directing the electromagnetic radiation to the silica soot at the first end, the electromagnetic radiation entering the silica soot at the first end and propagating within the silica soot from the first end to the second end, the electromagnetic radiation propagating along a path circumscribing the central longitudinal axis.

2. The process of claim 1, wherein the silica soot includes a central cavity and wherein the preform further includes a core cane positioned in the central cavity.

3. The process of claim 1, wherein the silica soot has a density in the range from 0.35 g/cm$^3$-1.0 g/cm$^3$.

4. The process of claim 1, wherein the exposing heats the silica soot to a temperature in the range from 1075° C.-1325° C. for a time of at least 10 min.

5. The process of claim 1, wherein the exposing heats the silica soot to a temperature in the range from 1100° C.-1300° C. for a time in the range from 30 min-180 min.

6. The process of claim 1, wherein the silica soot waveguides the electromagnetic radiation.

7. The process of claim 1, wherein the electromagnetic radiation is totally internally reflected by the silica soot.

8. The process of claim 1, wherein the electromagnetic radiation propagates from the first end to the second end in a direction parallel to the central longitudinal axis.

9. The process of claim 1, wherein the electromagnetic radiation propagates along a quasi-helical path from the first end to the second end.

10. The process of claim 1, wherein the first end is textured to reduce reflection of the electromagnetic radiation.

11. The process of claim 1, wherein the exposing further includes directing the electromagnetic radiation to the silica soot at the second end.

12. The process of claim 1, wherein the exposing further includes rotating the preform.

13. The process of claim 1, wherein the preform is positioned in a reflective cavity, the reflective cavity having surfaces that reflect the electromagnetic radiation.

14. The process of claim 1, wherein the electromagnetic radiation includes two or more wavelengths in the range from 0.6 mm-3.0 mm.

15. The process of claim 1, wherein the absorbed electromagnetic radiation heats the preform from a temperature in the range from 10° C.-1000° C. to the temperature in the range from 1075° C.-1325° C.

16. The process of claim 1, further comprising:
doping the silica soot.

17. The process of claim 16, wherein the doping including exposing the silica soot to a doping precursor, the doping precursor comprising Cl or F.

18. The process of claim 17, wherein the doping precursor is $SiCl_4$ or $SiF_4$.

19. The process of claim 16, wherein the doping occurs at a temperature in the range from 1075° C.-1325° C.

20. The process of claim 16, wherein the doping occurs after the exposing.

21. The process of claim 1, further comprising sintering the preform, the sintering occurring at a temperature above 1350° C.

22. The process of claim 21, further comprising drawing an optical fiber from the sintered preform.

23. The process of claim 1, wherein the electromagnetic radiation is a beam of electromagnetic radiation.

24. The process of claim 10, wherein the textured first end comprises texturing features, the texturing features having a sub-millimeter length scale.

25. A process for heating a preform comprising:
exposing a preform to electromagnetic radiation having a wavelength in the range from 0.6 mm-3.0 mm, the preform comprising silica soot, the silica soot absorbing the electromagnetic radiation, the absorbed electromagnetic radiation heating the silica soot to a temperature in the range from 1075° C.-1325° C.; and
increasing the wavelength of electromagnetic radiation as the temperature of the silica soot increases.

26. A process for heating a preform comprising:
exposing a preform to electromagnetic radiation having a wavelength in the range from 0.6 mm-3.0 mm, the preform comprising silica soot, the silica soot absorbing the electromagnetic radiation, the absorbed electromagnetic radiation heating the silica soot to a temperature in the range from 1075° C.-1325° C.;
wherein the preform has an elongate shape, the elongate shape having a central longitudinal axis, the elongate shape including a first end and a second end, the silica soot extending from the first end to the second end; and
wherein the exposing includes directing the electromagnetic radiation to the silica soot at the first end, the electromagnetic radiation entering the silica soot at the first end and propagating within the silica soot from the first end to the second end; and
wherein the method further comprises varying an angle at which the electromagnetic radiation is directed at the first end.

* * * * *